April 7, 1936. A. A. KNAPP 2,036,337
STRUCTURE FOR DARKROOM READING OF FINE CALIBRATIONS
Filed Feb. 25, 1935
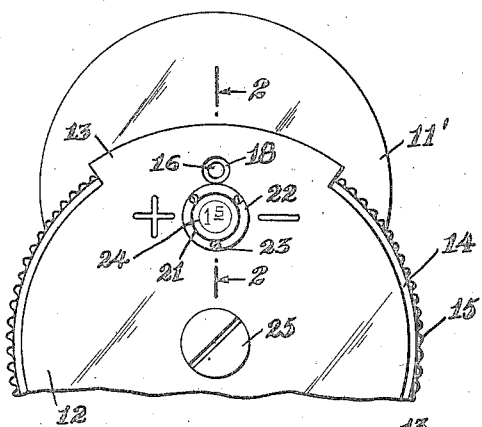
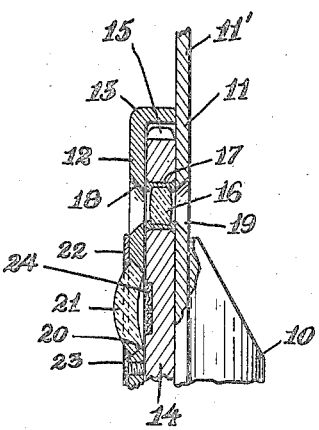
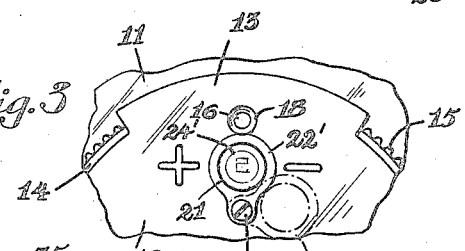
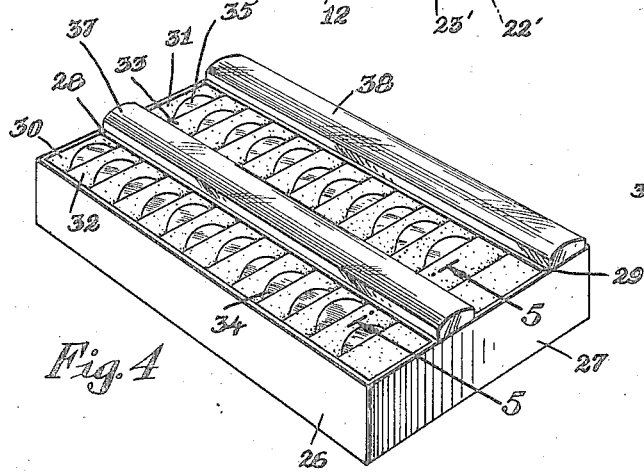
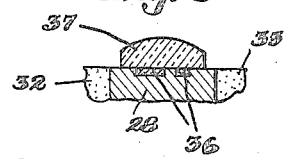
Arthur A. Knapp INVENTOR.
BY *Alexander Mencher*
ATTORNEY.

Patented Apr. 7, 1936

2,036,337

UNITED STATES PATENT OFFICE 2,036,337

STRUCTURE FOR DARKROOM READING OF FINE CALIBRATIONS

Arthur A. Knapp, New York, N. Y.

Application February 25, 1935, Serial No. 7,962

2 Claims. (Cl. 88—22)

This invention relates generally to means for improving the ease of reading of fine calibrations, but more specifically to the application of a lens to instruments bearing graduated notations, the said notations being phosphorescent to afford reading in a dark room and the said lens being of a composition to prevent penetration therethrough of the rays effecting the phenomenon of phosphorescence.

The main object of the invention resides in the provision of a means of rendering numerical notations or graduations on scientific instruments magnified and luminous and at the same time shielding the operator or user from the rays exciting the said luminosity.

Another object of the invention resides in the provision of a means of making dark room readings of scales and notations of all natures in conjunction with scientific apparatus whereby the units of the said scales and the notations are enlarged, luminous and physically and physiologically shielded in relation to the operator or user.

An incidental object of the invention resides in the added comfort and reduction of strain which are afforded the operator and user when working under the disadvantages of a dark room and of reading small graduations and notations.

These objects and other incidental ends and advantages of the invention will hereinafter appear in the progress of the disclosure and as pointed out in the appended claims.

Accompanying this specification is a drawing showing an embodiment of the invention in two illustrative forms, corresponding reference characters on the views of the said drawing designating corresponding parts.

In accordance with the drawing:

Figure 1 is a front elevation of the upper portion of an ophthalmoscope showing the invention applied thereto.

Figure 2 is an enlarged sectional view of Figure 1 along the plane 2—2 thereof.

Figure 3 is a fragmentary view of Figure 1 showing an alternate position of the lens member.

Figure 4 is a view in perspective of a receptacle housing a graded series of lenses, the designations thereof being disposed on longitudinal panels adjacent the said series of lenses, the invention being applied to the said receptacle.

Figure 5 is a broken-away sectional view of Figure 4 along the plane 5—5 thereof.

In accordance with the invention and in accordance with the illustrative embodiments thereof shown in the accompanying drawing, Figures 1, 2 and 3 depict the construction of an ophthalmoscope to illustrate the application of the invention to numerical notations radially arranged on a revolving disc wherein the notations are separately exposed through an orifice in a body plate, while Figures 4 and 5 depict a sectional housing for lenses to illustrate the application of the invention to numerical notations or other graduations exposed to view.

From the drawing, the ophthalmoscope is comprised of a hollow shank 10 which is provided with the usual structure for furnishing light to the eye under examination, the said structure not being shown in the drawing. The said shank 10 is vertically and centrally affixed to the rear wall of a housing for a rotary disc having a plurality of lenses radially mounted therein and a plurality of numerical notations of the refractive power of each lens arranged radially on said disc thereunder. The housing for the rotary disc is provided with orifices proximate the upper end of the vertical diameter to align with any one lens of the rotary disc. The front plate of the housing is provided with an orifice directly below the lens orifice to bring into view the numerical notation corresponding to the particular lens exposed.

More specifically, the housing is comprised of a front body plate 12 being substantially circular in periphery and having upper and lower projecting circular segments 13 with rearwardly disposed flanges, the lower circular segment 13 not being shown in the drawing, and a rear body plate having lower and upper parts 11 and 11' respectively. The lower part of the rear body plate follows the periphery of the front body plate 12 except for a projecting circular portion 11' serving as the upper part of the rear body plate.

A rotary disc 14 is mounted between the front and rear body plates 12 and 11—11' by means of a screw 25, the rearwardly disposed flanges of segments 13 serving as the spacing means between the said plates. The disc 14 is provided with a suitable bearing spindle projecting forwardly from the center of plate 11 into the interior of which screw 25 passes, the said bearing spindle not being shown in the drawing. Disc 14 is provided with a toothed edge 15 projecting slightly beyond the edges of front plate 12 and rear plate 11 to enable the operator's finger to rotate the said disc, while numeral 16 represents one of a series of radially disposed lenses suitably mounted in eyes 17 and numeral 24 represents one of a series of numerical notations of the refractive power of corresponding lenses, the said numerical notations being arranged radially on the front face of the disc 14 and directly below the lenses 16.

Proximate the upper end of the vertical diameter of the front and rear plates 12 and 11 respectively are orifices 18 and 16 adapted to align with any one lens 16 of rotary disc 14, while directly below orifice 18 is a second orifice 20 on the front plate 12 which serves to expose to view one of the numerical notations corresponding with the refractive power of the particular lens exposed to view. The rotary disc 14 is provided with a series of radially disposed notches on the rear face thereof which engage with a small springably mounted plunger penetrating the rear plate 11 whereby the position of each lens 16 and each numerical notation 24 is centrally fixed relative to the orifices 18 and 20 respectively during rotation of the said disc. The ratchet means just described are not shown in the drawing.

The ophthalmoscope above described is merely illustrative and may embody a superposing rotary disc and a quadrant both containing lenses and so arranged in combination that any lens either singly or in combination may be brought into position behind orifice 19 and that any numerical notation may be brought into position behind an orifice such as orifice 20.

The invention proper as applied to the above described opthalmoscope will now be described. Orifice 20 in front plate 12 of the housing for rotary disc 14 is provided with a magnifying lens 21 and is mounted thereover and against front plate 12 by any of the known means. As shown in Figures 1 and 2, lens 21 penetrates the conical walls of orifice 20 and sits therein on its own corresponding conical edges. A ring member 22 is fitted over the outer face of lens 21 and affixed to the front face of plate 12 by means of screws 23. An alternate method of mounting lens 21 on plate 12 and over orifice 20 is shown in Figure 3. A lens frame 22' is provided which engages lens 21, the said lens frame being pivotally mounted against the front face of plate 12 by means of a screw 23'. By such a method, the lens 21 may be shifted to free the orifice 20. The numerical notations 24 are marked by a phosphorescent paint composition utilizing the salts of radio-active substances such as radium. To protect the operator from rays emanating from such marked numerical notations, lens 21 is made of any well known optical lead glass which is substantially impervious to the passage of the said rays.

The invention as applied to notations on stationary panels in contradistinction to rotary discs is illustrated in Figures 4 and 5. Numerals 26 and 27 represent the longitudinal and transverse walls of a housing for a set of graded lenses, while numeral 28 represents a longitudinal intermediate partition having an upper and exposed face. Numeral 29 represents the longitudinal and end panel adjacent the rear longitudinal wall 26 and is provided with a similar upper and exposed face as partition 28. Numerals 30 and 31 represent the forward and rear compartments of the housing. Each of the compartments is provided with nests to hold lenses singly, the nests being formed by a series of parallelly arranged and inclined soft partitions 32 and 33 respectively. Compartment 30 receives lenses 34 and compartment 31 receives lenses 35. The upper and exposed faces or panels of intermediate partition 28 and end panel 29 are provided with notations opposite each nest or lens contained therein to designate the refractive index of each particular lens. The notations designated by numeral 36 are similarly marked by a phosphorescent paint composition utilizing the salts of radio-active substances such as radium. Superposing the said notations on intermediate partition 28 and end panel 29 are provided similar magnifying lenses 37 and 38, each of the said lenses being longitudinally disposed and made of an optical lead glass which is substantially impervious to the rays emanating from the phosphorescent paint composition.

Thus, it may be seen that the invention has special application to readings made from scientific apparatus whereon the notations are small and where such readings must be made in dark rooms.

It is distinctly understood that minor changes and variations in the construction of parts of the invention, the cooperation of the several parts, and the steps in the method of attaining the described results may all be resorted to without departing from the spirit of the invention and without departing from the scope of the appended claims. It is furthermore understood that the invention is applicable to instruments and apparatus requiring magnification of notations thereon for dark room readings other than the instrument and apparatus described herein for purposes of illustrating the invention.

I claim:

1. In an ophthalmoscope, a housing having front and rear walls, the said walls including a disc rotatably mounted therebetween, the said disc having a plurality of lenses radially disposed therearound, notations marked in phosphorescent paint composition radially disposed below said lenses on the front face of said disc, the front wall being provided with an orifice having inwardly tapered walls and exposing said notations singly, a magnifying lens seated in the said tapered walls and covering said orifice, and an annular ring around the said lens being flush with and affixed to the said front wall and being adapted to secure the said lens in place.

2. In an ophthalmoscope, a housing having front and rear walls, the said walls including a disc rotatably mounted therebetween, the said disc having a plurality of lenses disposed therearound radially, notations marked with a radioactive paint composition and being radially disposed below said lenses on the front face of said disc, the front wall being provided with an orifice having inwardly tapered walls and exposing said notations singly, a magnifying lens substantially impervious to the rays of the said paint composition, the said lens being seated in the said tapered walls and covering said orifice, and an annular ring around the said lens being flush with and affixed to the said front wall and being adapted to secure the said lens in place.

ARTHUR A. KNAPP.